(12) United States Patent  (10) Patent No.: US 8,972,987 B2
Ciano et al.  (45) Date of Patent: Mar. 3, 2015

(54) MANAGING SOFTWARE CONTENT IN VIRTUAL DESKTOP ENVIRONMENTS

(75) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/492,719

(22) Filed: Jun. 8, 2012

(65) Prior Publication Data

US 2012/0246647 A1  Sep. 27, 2012

Related U.S. Application Data

(63) Continuation of application No. PCT/EP2010/067596, filed on Nov. 16, 2010.

(30) Foreign Application Priority Data

Dec. 11, 2009 (EP) .................................. 09178948

(51) Int. Cl.
    *G06F 9/455* (2006.01)
(52) U.S. Cl.
    CPC .................................. *G06F 9/45533* (2013.01)
    USPC .......................................................... 718/1
(58) Field of Classification Search
    None
    See application file for complete search history.

(56) References Cited

U.S. PATENT DOCUMENTS

| 2003/0101440 | A1 | 5/2003 | Hardin et al. |
| 2006/0136720 | A1 | 6/2006 | Armstrong et al. |
| 2008/0126785 | A1 | 5/2008 | Chong et al. |
| 2008/0134178 | A1 | 6/2008 | Fitzgerald et al. |
| 2009/0241105 | A1 | 9/2009 | Perrone et al. |

FOREIGN PATENT DOCUMENTS

TW  200925878 A  6/2009

OTHER PUBLICATIONS

[Fedora-virt] Announce: virt-inspector, Richard Jones, May 19, 2009.*
Jones, Richard; "[fedora-virt] Announce: virt-inspector", redhat.com/archives/fedora-virt/2009-May/msg00073.html, pp. 1-2, May 19, 2009.
Shanklin, C., "VMware: VIX API Blog: What is VIX and why does it matter?", blogs.vmware.com/vix/2008/07/what-is-vix-and.html, pp. 1-2, Jul. 7, 2008.
DMTF, "Open Virtualization Format Specification", Document No. DSP0243, http://www.dmtf.org/standards/published_documents/DSP0243_1.0.0.pdf, pp. 1-41, Feb. 22, 2009.
International Search Report and the Written Opinion of the International Searching Authority for PCT Application No. PCT/EP2010/067596; Mailing date of Feb. 18, 2011; European Patent Office; Rijswijk, Netherlands.
International Preliminary Report on Patentability and Written Opinion of the International Searching Authority for PCT Application No. PCT/EP2010/067596; Mailing date of Jun. 21, 2012; The International Bureau of WIPO; Geneva, Switzerland.

* cited by examiner

*Primary Examiner* — Mengyao Zhe
(74) *Attorney, Agent, or Firm* — Thomas E. Lees, LLC

(57) ABSTRACT

Software is managed in a virtual desktop environment by discovering virtual appliances contained in the virtual desktop environment, and for each virtual appliance discovering the virtual machines belonging to the virtual appliance. Software is further managed by discovering the standalone virtual machines comprised in the virtual desktop environment, and for each discovered virtual machine, introspecting each virtual machine to detect non-virtual applications and virtualized applications running in the virtual machine. For each detected application, identification is made of the operating system on which the application is running.

26 Claims, 7 Drawing Sheets

| Product Name | Type | VM/OS | Virtual Appliance |
|---|---|---|---|
| Prod1 | Normal | Host/Windows | --- |
| Prod2 | Normal | Host/Windows | --- |
| Prod3 | AV | Host/Windows/Altiris | --- |
| Prod4 | AV | Host/Windows/ThinInstall | --- |
| Prod4 | AV | VM2/Linux/Zero Install | --- |
| ProdA | Normal | VM1/Linux | VA1 |
| ProdB | Normal | VM2/Windows | VA1 |
| ProdX | Normal | VM3/Mac | VA1 |
| ProdZ | Normal | VM3/Linux | VA1 |

FIGURE 3

MANAGING SOFTWARE CONTENT IN VIRTUAL DESKTOP ENVIRONMENTS

CROSS-REFERENCE TO RELATED APPLICATIONS

This application is a continuation of International Application No. PCT/EP2010/067596, filed Nov. 16, 2010, entitled "SYSTEM AND METHOD OF MANAGING SOFTWARE CONTENT IN VIRTUAL DESKTOP ENVIRONMENTS", which claims the benefit of EP 09178948.7, filed Dec. 11, 2009, entitled "SYSTEM AND METHOD OF MANAGING SOFTWARE CONTENT IN VIRTUAL DESKTOP ENVIRONMENTS", the disclosures of which are hereby incorporated by reference.

BACKGROUND

The present invention relates generally to computer systems and in particular to managing software content in virtual desktop environments.

In physical environments, a single computing device comprises a single operating system in which the user may run application programs as desired. Similarly, a server computing device runs a single operating system that runs application programs.

Such physical environments appear to be costly because each computing device needs a complete set of processors, memory, and input/output devices to properly function whether it is being used or not. Furthermore, physical environments can also be inefficient in that some of the computing devices which are not processing tasks are set in an idle state, waiting for a task during a certain time until workloads increase.

Virtual desktop environments have been developed to overcome the deficiencies of physical environments. In a virtual desktop environment, more than one operating system can run on a single computing device, sharing resources such as memory and processors.

A virtual desktop environment includes virtual servers and virtual desktops for hosting multiple operating systems and multiple applications locally and in remote locations, avoiding thereby physical and geographical limitations.

Virtual desktop environments are based on application virtualization that encapsulates the applications from the operating system, and include virtual machines (VM)s and virtual appliances (VA)s. A virtual machine is a tightly isolated software container that can run its own operating system and applications as if it were a physical computer. A virtual machine further comprises a virtual (i.e., software-based) CPU, RAM hard disk and network interface card (NIC).

Virtual appliances are provided to pre-build software solutions comprised of one or more virtual machines that are packaged, updated, maintained and managed as a unit. Unlike a traditional hardware appliance, these software appliances make it possible for the user to easily acquire, deploy and manage, pre-integrated solution stacks.

As virtualization becomes more and more popular, computer desktops tend to contain not only the common native applications installed thereon but also application packages (or software products) available in virtualization environments.

All applications deployed in a virtual desktop environment must coexist in a common runtime environment which is the operating system in which they have been installed. However, the installation of a new application may impact an existing environment.

An existing approach taken to detect and manage software content installed in a virtual desktop environment relies on usage signatures to determine if a given application is running on a target machine and installation signatures to determine if the application is simply installed on the target machine.

However, software products that create application virtualization environments do not register an installed application in operating system registries and do not execute any kind of explicit installation action that allows tracking the product installation. Further, the products that create application virtualization environments do not always run an application executable file name and size in the manner it would in a normal environment.

Another approach taken in U.S. Pat. Pub. No. 2009/0241105 uses the identifying signature of the main dice associated with an application asset stored on a target computer, when an application is deployed and executed in the target computer. The identifying signature is added to the signature catalog as a new type of signature to identify "virtualized installations". The detection of this virtual installation signature flag in a target computer is used to detect that the associated application is virtually installed on the target machine and running therein. However this approach is limited to the single system and does not provide a complete view of the software applications installed in a virtual desktop environment.

BRIEF SUMMARY

According to aspects of the present invention, software is managed in a virtual desktop environment by discovering virtual appliances contained in the virtual desktop environment, and for each virtual appliance, discovering virtual machines belonging to the virtual appliance. Software is further managed by discovering standalone virtual machines comprised in the virtual desktop environment. Still further, software is managed by introspecting each discovered virtual machine to detect non-virtual applications and virtualized applications running in the virtual machine, and for each detected application, identifying the operating system on which the application is running.

BRIEF DESCRIPTION OF THE SEVERAL VIEWS OF THE DRAWINGS

Embodiments of the present invention will now be described by way of non-limiting example with reference to the accompanying drawings in which like references denote similar elements. In the drawings:

FIG. 3 is a table illustrating an exemplary data structure maintained in the application repository;

The drawings are intended to depict only typical embodiments of the invention, and therefore should not be considered as limiting the scope of the invention.

As they may be cited in the following description, IBM and Tivoli are trademarks or registered trademarks of International Business Machine Corp., in many jurisdictions worldwide, and VMware is a registered trademark of VMware Inc. in the United States and other countries. Other company, product or service names may be the trademarks or service marks of others.

DETAILED DESCRIPTION

Figure 1:
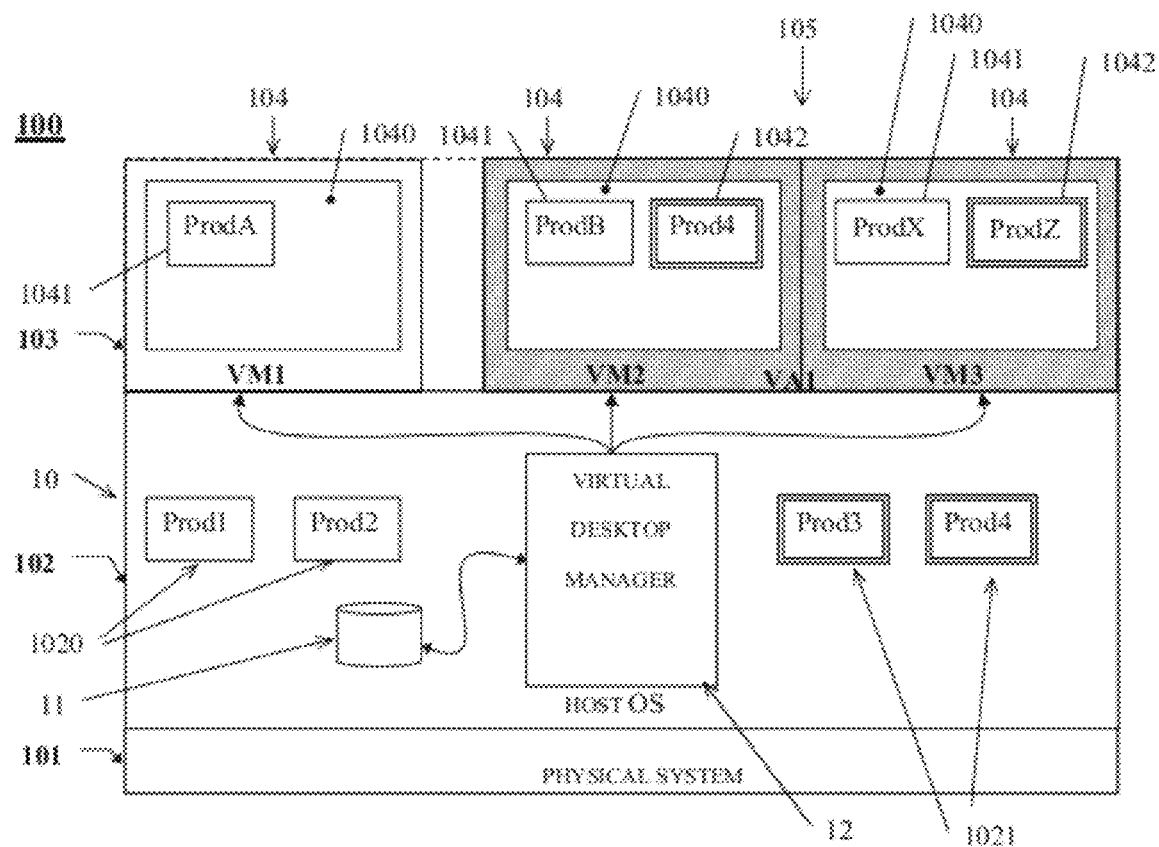
FIG. 1 depicts a system for managing software content in a virtual desktop environment.

FIG. 1 represents a system 100 for managing software content in a virtual desktop environment according to aspects of the invention. The virtual desktop environment may be purely virtualized, i.e., all of its components are virtual components, or may be a combination of virtualized and non-virtualized components.

The virtual desktop environment includes a host platform 10 comprising a physical stack 101 that runs a physical host operating system (OS) 102 such as Windows, Linux, UNIX or MacOS X.

The virtual desktop environment further includes a virtual layer 103 for allowing access to a set of virtual machines 104, such as virtual machines VM1, VM2, VM3. The software layer providing the virtualization is called a virtual machine monitor or hypervisor. The hypervisor refers to a program that is used to manage and run the virtual machines and/or virtual appliances. The hypervisor runs on the host platform 102 and presents abstractions of the host platform to other software in the form of a set of virtual machines VM1, VM2, VM3. The hypervisor controls the resources enabling the virtual operating environment (processor, memory, storage, etc.) and can create new virtual resources using the host resources to emulate the new virtual devices. Although only three virtual machines are represented (VM1, VM2 and VM3), the skilled person will easily understood that the host may comprise other configurations of virtual machines.

The physical stack 101 consists of a number of hardware resources (such as storage, network and servers) that are shared across the different virtual machines 104, each running its own operating system (or guest operating system). Accordingly, multiple OS environments can co-exist on a same physical computer, in strong isolation from each other.

A virtual machine 104 is a kind of isolated software container that can run its own applications and operating system as if it were a physical computer. A virtual machine behaves exactly like a physical computer and contains it own virtual (or software-based) CPU, RAM hard disk and network interface components. Each virtual machine 104 can isolate the software running in the virtual machine from the other virtual machines and the physical machines.

Each virtual machine 104 includes its own operating system 1040 ("VM OS"), and a number of non-virtual software products (also referred to as "non-virtual applications" or "conventional applications") 1041 such as ProdA for VM1, ProdB for VM2 and ProdX for VM3. Each virtual machine may also include a number of virtual applications or application virtualization products 1042 such as Prod4 for VM2.

In the present description, the terms "product", "software product", "application software", "software application" or "application" are used similarly to designate computer programs designed to perform a particular task or work or functionality.

The host operating system 102 includes a number of non-virtual software products 1020 such as Prod1 and Prod2 and a number of virtualized applications (also referred to as "application virtualization products" or "virtual applications") 1021 such as Prod3 and Prod4.

The computer environment also includes virtual appliances 105 such as VA1 (represented by hashed lines). Virtual appliances are pre-built, self-contained software solutions, comprised of one or more virtual machines VM2, VM3 that are packaged, updated, maintained and managed as a unit. A virtual appliance is self-contained as most of the software components and required operating system resources are encapsulated within the virtual appliance. A virtual appliance 105 further represents a software image containing a software stack designed to run inside one or more virtual machines VM2 and VM3. An image refers to an executable copy of program code.

In the present description, the expression "standalone virtual machine" will be used to distinguish a virtual machine that is not involved in a virtual appliance such as VM1 from the virtual machines involved in virtual appliances such as VM2 and VM3.

Non-virtual products 1020 or 1041 can share the same components. They can also interface with operating system components.

Virtualized applications (or application virtualization products) 1021 or 1042 designate computer programs that are executed in an application layer that is different from the operating system layer. A virtualized application is not installed according to conventional process while it is executed as if it is. Application virtualization designates the process by which an application is fooled into believing that it is directly interfacing with the operating system and all the resources managed by it, while in reality it is not. The application virtualization process is such that when the virtualized application installs, it can perform all conventional file and registry operations (storing files on the file system when it installs, storing configuration information in the registry, using environment variables, modifying existing files when it installs, etc.), but instead of actually committing these changes to the underlying OS instance, these operations are intercepted and logged separately in a virtualization layer. The application performing the file and Registry operations do not know that it is not actually accessing the physical resources. By adding a layer of isolation between the OS and the application, this avoids the problem of application incompatibility. This layer of isolation may be obtained by packaging the application into a virtualized version of itself without requiring the installation of special drivers or extra infrastructure on the client or on a backend server.

Each virtual application is generally packaged with registries, dynamic linked libraries, and other application objects. The package may be executed in a cache, creating a virtual application. When a virtual application is deployed, it uses its own copy of these shared resources. The execution of a virtual application may be performed without interfering with other applications. Currently, there are two primary approaches to application virtualization: a server-side approach and a client-side approach. In the server-side approach of application virtualization, applications are installed, maintained and secured in a data center, while only screen displays, keyboard entry and mouse movements traverse the network. In the client-side approach of application virtualization, applications are packaged and streamed to the local desktop using an application streaming mechanism, and as a result, these applications can use local desktop CPU resources, and local peripherals. In the client-side approach, a virtualized version of the application is pushed down to the desktop. Application streaming mechanisms allow the automatic downloading of applications from a central server to an endpoint such as a PC or a terminal device on demand, thereby eliminating the need to install applications on the endpoint. According to application streaming technologies, the virtual applications are supplied from the central server to the user client when the user needs to launch the application. The central server starts transmitting portions of the virtual application (executable instructions) to the client device so that so that the user can start working immediately. Hence, the virtual application may begin execution on the user client device with only a portion of the executable instructions. Rather than installing the same applications on every client machine, only the applications modules the users actually want to run are delivered. The other application modules may be selected and downloaded on demand.

The system 100 for managing software content in the virtual desktop environment further includes a virtualization desktop manager 12 for discovering the software applications available in the virtual desktop environment. The virtualization desktop manager 12 may be provided in the host operating system 102. Alternatively, the virtualization desktop manager 12 can be provided in a remote location. In such embodiments, an agent may be installed locally in the host operating system 102 and be coupled to the virtualization desktop manager 12 through suitable communication means in order to provide the virtualization desktop manager 12 with the required information. The following description will be made with reference to a virtualization desktop manager 12 locally provided in the host operating system 102, for illustrative purpose only.

More specifically, the virtualization desktop manager 12 is configured to discover and manage the software application running in the virtual desktop environment using information about the virtual Machines VMs 104, information about the virtual appliances 105, information about the application stacks 1041 and 1042 available in the virtual machines, and information about the application stacks 1020 and 1021 installed in the Host Operating System OS 102.

The system 100 also includes a virtualization knowledge repository 11 for storing information about the detected software content such as whether it is a non-virtual product or an application virtualization product, if it relates to a virtual machine operating system, a virtual appliance or a host operating system.

The virtualization desktop manager 12 is further adapted to generate a display of the products available in the computing desktop environment providing details about the products such as indications that they are local applications, virtualization applications or applications running in virtual machines belonging or not belonging to virtual appliances as illustrated in FIG. 3.

The virtualization desktop manager 12 may also interact with a user interface to generate a display of the information stored in the virtualization knowledge repository 11. The user interface may be part of an application management tool allowing the user to perform operations in relation with the discovered software content such as application removal operation.

Accordingly, the user interface may present a view that is similar to a conventional desktop, but instead of displaying the physical content of the user computing device, the user is presented all the software content running in the virtual desktop environment (both conventional applications or virtual applications, whether running in a standalone virtual machine, in a virtual appliance or the host operating system).

In certain embodiments of the invention, the user interface may include only the applications available to the user in the desktop environment depending on whether the user is granted access to all the virtual machines or only to some virtual machines.

Even if not limited to such applications, the invention has particular advantages for the following applications:
- for managing the creation or removal of software applications in a virtual desktop environment, the system 100 being used to "introspect" virtual resources and inspect hosted software content to generate an add/remove program tool;
- to keep an up-to-date list of virtual resources (virtual machines, virtual appliances, etc.) as they are added in the virtual desktop environment;
- to maintain an overall compliance state of the host, including content hosted in the virtual machines;
- to manage installation of new software applications (e.g., DVD auto start), the system 100 being adapted to intercept the most suitable virtual machine image that can host the new software application;
- to manage the connection of new peripherals (e.g., an USB storage devices) to the host, the system 100 being adapted to generate a widget to help the user select the virtual machine to which the new peripheral should be connected.

Figure 2:
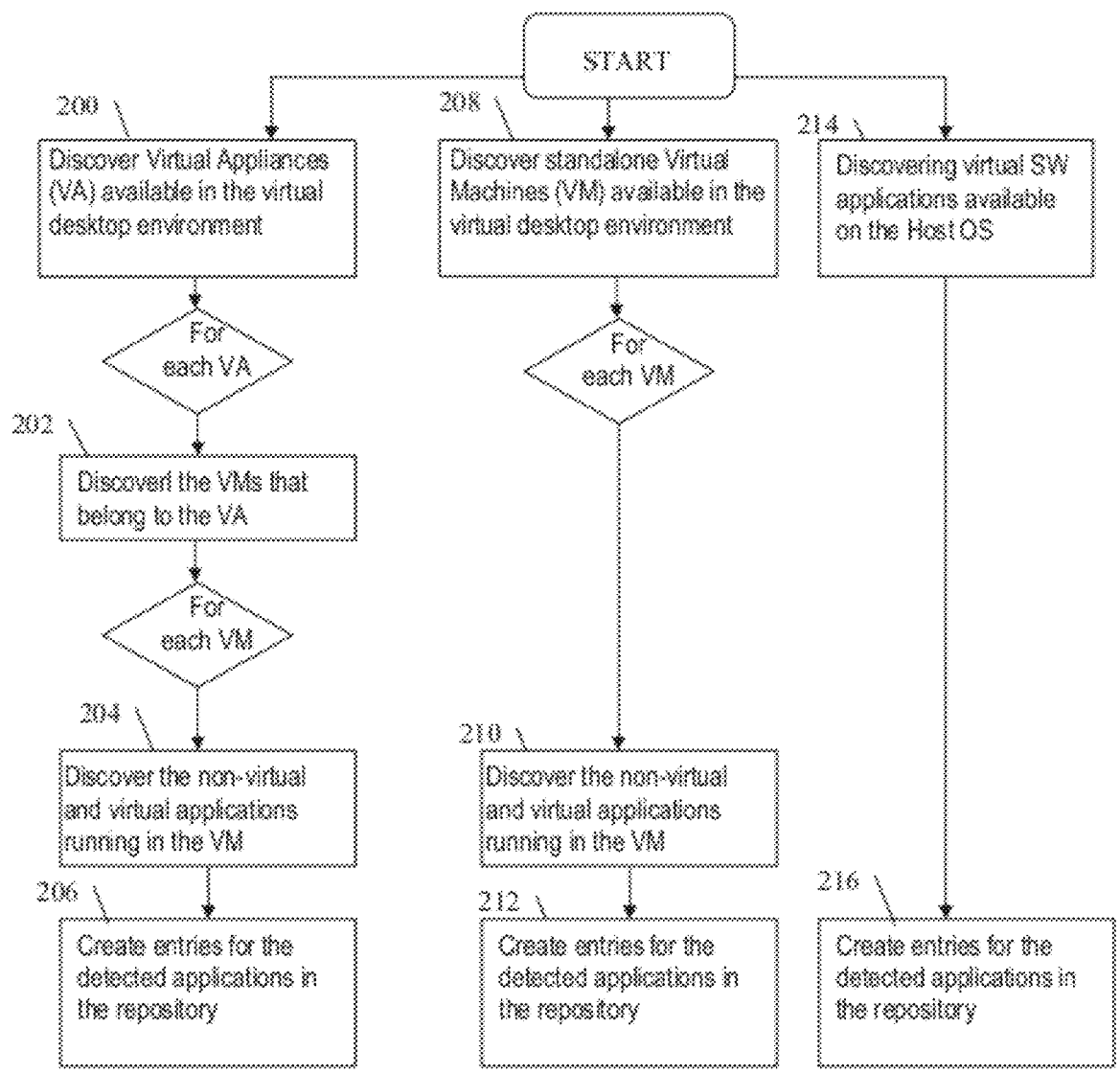
FIG. 2 is a flowchart for discovering software content in a virtual desktop environment according to certain embodiments of the invention.

FIG. 2 describes the method for discovering the software applications available in the virtual desktop environment.

In step 200, the virtual desktop environment is scanned to identify all the virtual appliances that it comprises. This information may be extracted from the virtual appliance descriptors maintained in the virtual desktop environment.

For each identified virtual appliance (VA), step 202 identifies all the virtual machines belonging to the considered virtual appliance. The step of identifying virtual machines belonging to the virtual appliance may be performed by directly extracting the information from the virtual appliance descriptor, for example by accessing metadata in configuration files such as Open Virtualization Format (OVF) files.

For each virtual machine identified in step 202, step 204 retrieves the software components installed in the considered virtual machine, including non-virtualization products such as ProdB for virtual machine VM2 and application virtualization products such as Prod4 for virtual machine VM2, the virtual machine VM2 belonging to virtual appliance VA1.

This information may be directly extracted from the virtual appliance descriptor. Alternatively, one or more sensors may be installed in the virtual machines to discover the products installed in each virtual machine. Such sensors may include discovering agents or rely on agentless discovery technology, like IBM TADDM (Tivoli Application Dependency Discovery Manager). According to yet another embodiment of the invention, step 204 may be performed by navigating the virtual machine disk format from an external discoverer. This may be performed by using APIs (Application Programming Interfaces) for connecting and navigating in virtual disks, even if the considered virtual machine is not active.

The invention processes the "discovered" software content not only as a pure software content having software attributes such as a product name, a version number, a license or a vendor name, but also as a container of further resources (such as guest OS). In particular, any virtual machine discovered in the virtual desktop environment is introspected to detect elements hosted there, along with their attributes.

In step 206, information related to the products identified in step 204 are stored in the virtualization knowledge repository 11. More specifically, an entry is created for each detected product, identifying if it is a conventional product or an application virtualization product, the virtual machine operating system on which it is running and the virtual appliance it belongs to.

In step 208, the virtual desktop environment is scanned to retrieve the standalone Virtual Machines. Standalone virtual machines are not involved in a particular virtual appliance. The next steps 210 and 212 are similar to step 206 and 208 with some differences related to the fact that the virtual machines are standalone.

For each standalone Virtual machine (such as VM1), step 210 is performed to retrieve the software components installed in the considered virtual machine, including non-application virtualization products. Step 210 may be performed by extracting the information directly from the virtual machine descriptor or a configuration file. Configuration files comprise parameters added by the applications installed in the virtual desktop environment which can be used to identify the software applications installed in the virtual machine. Alternatively, one or more sensors may be installed in the virtual machines to discover the product installed. According to yet another alternative, the virtual machine disk format may be navigated from an external discoverer using a discovery agent or an agentless discovery technology as described in relation to step 204.

In step 212, information related to the products identified in step 210 are stored in the virtualization knowledge repository 11. An entry is created for each detected product, identifying if it is a conventional product or an application virtualization product, the virtual machine operating system on which it is running and that the virtual machine on which the product is running is a standalone virtual machine.

In step 204 and 210, each virtual machine that is being processed can be additionally marked with an "already processed" tag to avoid reprocessing a same virtual machine another time.

In step 214, the Host Operating System 402 is scanned to detect the software components installed on it including conventional products such as product Prod1 and application virtualization products such as products Prod 3 or Prod4. To detect application virtualization products installed in the host operating system 402, step 214 determines for each product installed in the host OS 402 if the product is an application virtualization product. Step 214 may be performed by directly extracting information from the application virtualization executable file, for example by retrieving executable attributes. The application virtualization executable file includes the application and also the virtualization layer that isolate the application from the OS. The file name and the size attributes can be used to determine that it is an application virtualization version of a specific product. The application virtualization executable file can further contain additional executable attributes which can be used to identify that it is an application virtualization product. Alternatively, step 214 may be performed by extracting the information from the application virtualization configuration file. In some implementations, a separate application virtualization configuration file is provided that contains useful data for discovering the product information. Such file can be located anywhere, so that a disk scan may be needed to find it. It can contain reference to the application virtualization executable file.

In step 216, the information related to the products identified in step 214 are stored in the virtualization knowledge repository 11. An entry is created for each product detected in the host operating system, identifying if it is a conventional product or an application virtualization product, and that the product is running on the host operating system.

The virtualization desktop manager 12 may then generate a display of the information contained in the virtualization knowledge repository 11 on the user interface. This display will allow the user identify the software content installed in the virtual computer environment 400. In certain embodiments of the invention, the display will be made in the form of a software management tool provided to allow the user to manage the software applications of the virtual computer environment, and perform operations such as add/remove program operations.

Even if steps 214 to 216 have been described as being performed after steps 200 to 212, the skilled person will readily understood that these steps 214 to 216 could be alternatively performed in a different order such as simultaneously.

The above steps 206, 210 and 214 of discovering the software content included in the virtual machines, in the standalone virtual machines and in the host operating system may use specific APIs (Application Programming Interfaces) depending on the virtualization technology.

For example, each virtual machine may be preconfigured to shield external interactions (network) and state-changes (non-persistent storage), if the virtual machine is not yet active. The virtual machine may be activated and an API (Application Programming Interface) may be used to detect software contained in the virtual machines (steps 206 and 210), such as "Vix" API for VMWARE virtualization technology. The file system can be also scanned (for virus signature checks). If the considered virtual machine is not active when step 206 or 210 are started, the virtual machine may be deactivated after step 206 or 210 is performed.

In step 208, 210 and 212, the discovered information may be further cached in the Virtual machine repository.

FIG. 3 illustrates an exemplary data structure used to store information related to the discovered products in the virtualization knowledge repository 11 and to allow generating a display of this information on the user interface 46.

As shown, the discovered data are represented in a way that allows sorting and filtering on the rows. Each row is related to a given discovered product. The first column entitled "Product name" contains the names of the products for each discovered product, such as for example "Prod1", "Prod 2", "ProdA". The second column entitled "type" indicates if the product is a non-application virtualization product (type="Normal") or an application virtualization product (type="AV"). The third column entitled "VM/OS" indicates the operating system "OS" of the virtual machine "VM" to which the product belongs. "Host" is indicated if it is contained in the host operating system. For example product "ProdX" is contained in the OS "Mac" of virtual machine VM3. The last column entitled "virtual appliance" indicates the virtual appliance to which the product belongs, such as for example "VA1" for product "ProdA".

From this information, the virtualization desktop manager can generate an application management tool allowing the user to perform operations on all the products contained in the virtual desktop environment (represented in the virtualization knowledge repository 11 by each row of the product table structure), whether non-application virtualization products or application virtualization products. For each row, some actions can be executed such as Add, Remove, Update operations.

The method of discovering software content in the virtual desktop environment in accordance with the invention may be triggered on user request or scheduled to be triggered periodically. Alternatively, the method may be triggered by a particular event received by the virtualization desktop manager, such as for example the deployment a new virtual machine or virtual appliance, or the dismissal of a virtual machine or virtual appliance.

The method according to the invention relies on introspection of virtual resources to inspect the software content installed in the desktop environment. It may be used to keep the list of virtual resources (e.g., VMs, VAs, etc.) as they are added in the virtual desktop environment. An overall compliance state (e.g., virus-free, malware free, compliant to policies, etc.) of the host, including content hosted in VMs, can be also maintained, using the discovering method according to the invention.

The method of discovering software content in the virtual desktop environment in accordance with the invention may be further used to manage installation of new software applications in the virtual desktop environment, and more specifically to intercept the most suitable virtual machine image that can host a new software that is to be installed (such as DVD auto-start) based on the software content discovered. Installation of new software based on the discovered software content in may comprise the following steps:

1. Retrieving from the repository the list of the available Operating systems (OS) with the associated information;
2. Selecting from the list of available OSs, only the OSs that are compatible with the new applications and the action to be performed (for example it is not possible to install a Windows application on Linux OS) based on predefined compatibility rules;
3. Displaying the selected OSs and the associated information for selection of a target OS;
4. Installing the new software inside the target OS; and
5. Updating the virtualization knowledge repository 11 that contains the information about the virtual machine OS and the installed applications.

Similarly, when new peripherals (e.g., an USB storage device) are to be connected to the host, a widget may be generated from the discovered software content to help the user select the virtual machines to which the new peripherals should be connected. The virtual disk machine component can either provide such features in a standalone fashion, or extend local Admin widgets (add/remove program widget) to also cover virtual resources.

According to another embodiment of the invention, the discovered software may be used to manage external device interaction with multiple Operating Systems (Host and Virtual) available in a virtual desktop environment.

Figure 4:
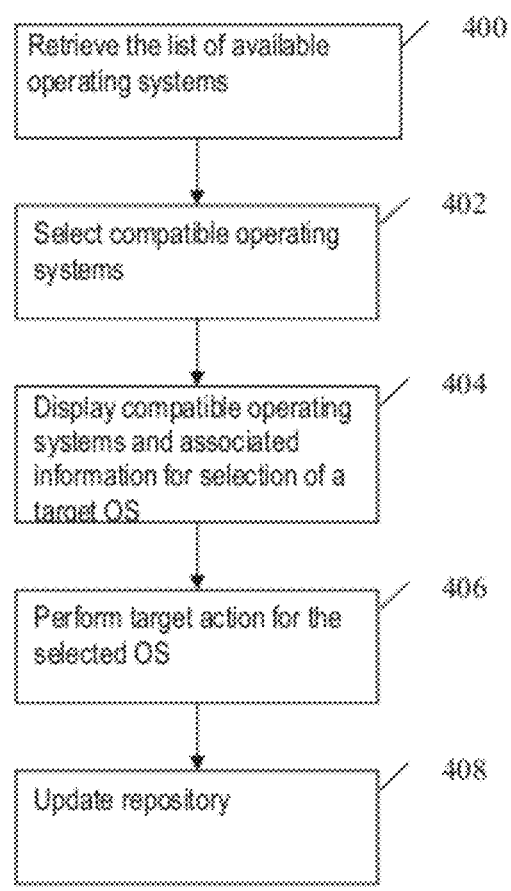
FIG. 4 is a flowchart for managing external device interaction with multiple Operating Systems, according to an embodiment of the invention.

FIG. 4 is a flowchart for managing external device interaction with multiple Operating Systems, according to this embodiment of the invention.

In response to a device requiring selection of a target directory to perform a given action, such as for example when the DVD autorun starts the setup program asking for the drive, steps 400 retrieves from the virtualization knowledge repository 11 the list of the operating systems available in the virtual desktop environment with the associated information such as the OS name, the version, the type, etc.

In step 402, the operating systems among the operating systems identified in step 400 that are compatible with the external source are selected as well as the actions to be performed based on predefined compatibility rules (for example it is not possible to install a Windows application on Linux operating system). Compatibility Rules may be related to the installation file extension and step 402 of selecting the OS may check the installation file extensions (for example for a "setup.exe" or a ".msi" file, the compatibility Rules may define that OS Windows should be selected).

Figure 5:
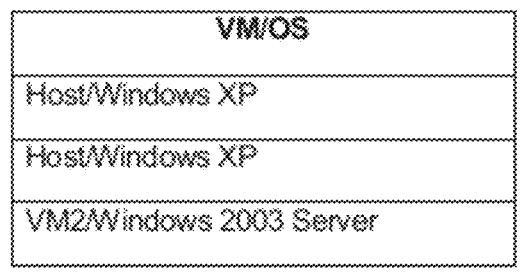
FIG. 5 is a table illustrating an exemplary selection of operating systems obtained with the method of managing external device interaction.

In step 404, the list of the operating systems selected in step 402 and the associated information (OS name, OS Version, Type) are displayed. FIG. 5 illustrates an exemplary list of selected operating systems with the indication of the virtual machine on which it is running or the indication it is running in the host operating system 102. For example, the list includes Windows XP for the Host Operating System or Windows 2003 Server as VM2 operating system.

In step 406, the desired target operating system can be selected among the operating systems indicated in the displayed list and the target action inside that OS is performed.

In step 408, the repository (or knowledge library) that contains the information about virtual machine operating systems and the software products installed in it is then updated based on the action performed in step 406 (for example if a product in installed successfully in a selected OS).

According to yet another embodiment of the invention, the discovered software content may be used to perform security/compliance checking operations (e.g., critical patches). Security/compliance checking operations consist in checking critical patches installed in multiple operating systems (Host and Virtual) available in a virtual desktop environment.

Figure 6:
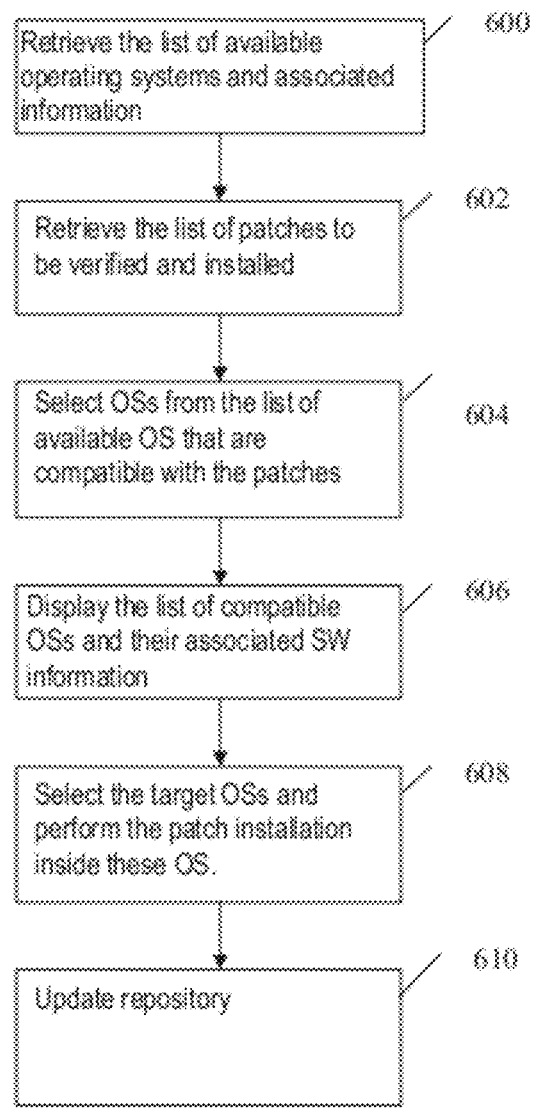
FIG. 6 is a flowchart for performing a security/compliance checking method according to another embodiment of the invention.

FIG. 6 is a flowchart describing exemplary steps performed to check security/compliance of a list of patches. The security/compliance checking process may be triggered manually or scheduled to run periodically.

In response to the triggering of the security/compliance checking process, step 600 retrieves from the virtualization knowledge repository 11 the list of all the operating systems available in the virtual desktop environment as well as associated information (such as information about the installed patches).

In step 602, the list of patches to be verified and installed is retrieved.

In step 604, only the operating systems that are compatible with the list of identified patches are selected using predefined compatibility rules such as rules depending on file types. For example, a patch incompatibility for Linux operating system could be detected for a Windows patch as it is not possible to install a Windows patch on Linux.

In step 606, the list of the operating systems selected in step 604 and the associated information are displayed.

In step 608, one or more target operating systems are selected among the list of operating systems selected in step 604. The patch installation is then performed inside the target operating systems. Alternatively, this step may be performed automatically if the identified patches have some properties like for example "patch_autoinstall=Yes". Further, the patches may be installed in all the selected operating systems at the same time or schedule for a different installation time for each operating system.

In step 610, the virtualization knowledge repository 11 that contains the information about the operating systems and the products installed on them is updated based on the patch installation performed in step 608.

Figure 7:
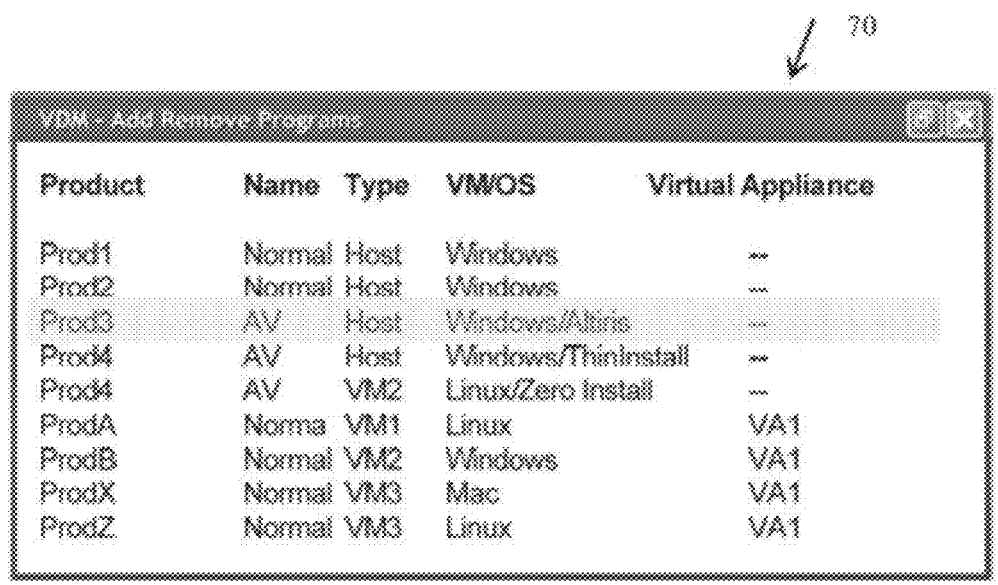
FIG. 7 depicts an exemplary user interface for managing applications running in the virtual desktop environment.

FIG. 7 shows an exemplary user interface 70 for managing applications running in the virtual desktop environment, according to an "add/remove Program" application of the invention.

The interface 70 is generated using the discovering mechanism in accordance with the invention to introspect the virtual desktop environment, discover its software content and generate a display of the discovered applications.

In response to the selection of a program for removal through the Add/Remove Program tool displayed on the user interface, the virtual virtualization desktop manager 12 invokes inside the Host or VM the application that is to be uninstalled. The invocation of the application may be performed using a suitable Application Programming Interface, such as VMware VIX APIs.

In response to the selection of a program for addition of the program to a given virtual machine through the Add/Remove Program tool, the virtual virtualization desktop manager 12 copies and invokes inside the virtual machine the installed application using suitable APIs such as VMware VIX APIs.

The method of discovering software content installed in a virtual desktop environment according to the embodiments of invention allows managing different kinds of virtual desktop environments running in a same Host operating system. It further provides an integrate view and management capability of all the virtual desktop environments and of the installed software products regardless if they are installed in the host or in a virtual machine.

The invention further allows identification of Virtual Machine resources (e.g., a virtual machine image) hosted in a virtual desktop environment (even a local workstation) and management the software content inside these resources. This overcomes the prior art issues encountered in virtual desktop environments having unknown resources, such as the presence of a virus hidden in virtual machines, software license incompliance and out-of-date virtual machine images causing unnecessary storage use.

Various aspects of the invention herein can manage not only conventional desktop resources but also all the resources available in virtual desktop environments. Aspects of the invention allow for the selection from the host operating system of virtual desktop environments as target for configuration operations such as installation, update, or remove operations. Aspects of the invention can be also used to maintain an overall compliance state of the host, including content hosted in virtual machines (e.g., virus-free, malware free, compliant to policies, etc).

Embodiments of the invention may take the form of an entirely hardware embodiment, an entirely software embodiment or an embodiment containing both hardware and software elements. In one embodiment, the invention is implemented as a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The storage medium can be an electronic, magnetic, optical, electromagnetic, infrared, or semiconductor system (or apparatus or device). Alternatively, a transmission medium can comprise a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

What is claimed is:

1. A method of managing software in a virtual desktop environment, the method comprising:
   discovering, in response to a trigger, virtual appliances contained in the virtual desktop environment, and for each virtual appliance, discovering virtual machines belonging to the discovered virtual appliance;
   discovering, in response to the trigger, virtual machines that do not belong to any discovered virtual appliance;
   introspecting each discovered virtual machine to detect applications running in the virtual machine, and for each detected application, identifying the operating system on which the application is running;
   storing, in a repository, information including each identified operating system;
   receiving a request to perform a target action;
   selecting, for the target action, at least one compatible operating system from the operating systems identified in the repository;
   identifying a target operating system from the at least one compatible operating system; and
   performing the target action on the target operating system of the corresponding virtual machine within the virtual desktop environment.

2. The method of claim 1, further comprising scanning a host operating system of the virtual desktop environment to detect the virtualized applications.

3. The method of claim 2, wherein scanning the host operating system comprises extracting information from application virtualization executable files.

4. The method of claim 2, wherein scanning the host operating system comprises extracting information from application virtualization configuration files.

5. The method of claim 1, wherein discovering virtual appliances comprises using information extracted from virtual appliance descriptor files maintained in the virtual desktop environment.

6. The method of claim 1, wherein introspecting each virtual machine to detect applications in the virtual machine comprises using information extracted from a virtual machine configuration file.

7. The method of claim 1, wherein introspecting each virtual machine to detect applications in the virtual machine comprises using information extracted from a virtual appliance descriptor file, if said virtual machine is discovered as belonging to a virtual appliance.

8. The method of claim 1, wherein the virtual machines in the virtual desktop environment are provided with at least one sensor, further comprising:
   introspecting each virtual machine comprises using information provided by the at least one sensor.

9. The method of claim 8, wherein introspecting each virtual machine using information provided by the at least one sensor comprises:
utilizing at least one sensor that includes a select one of a discovery agent and an agentless discovery technology.

10. The method of claim 1, wherein introspecting each virtual machine comprises navigating a virtual machine disk format from an external discoverer.

11. The method of claim 10, wherein navigating the virtual machine disk format from an external discoverer uses at least one Application Programming Interface for connecting and navigating in virtual disks.

12. The method of claim 1, wherein storing, in a repository, information including each identified operating system, further comprises:
storing additional information identifying the discovered applications in the repository, the additional information further associating each identified application to a particular identified operating system on which the application is running.

13. The method of claim 1, further comprising:
generating a display of the discovered applications with the information related to the operating system on which the application is running; and
using an Application Programming Interface to manage operations on the displayed applications.

14. A computer-readable storage device with an executable program for managing software in a virtual desktop environment, wherein the program instructs a processor to perform:
discovering, in response to a trigger, virtual appliances contained in the virtual desktop environment, and for each virtual appliance, discovering virtual machines belonging to the discovered virtual appliance;
discovering, in response to the trigger, virtual machines that do not belong to any discovered virtual appliance;
introspecting each discovered virtual machine to detect applications running in the virtual machine, and for each detected application, identifying the operating system on which the application is running;
storing, in a repository, information including each identified operating system;
receiving a request to perform a target action;
selecting, for the target action, at least one compatible operating system from the operating systems identified in the repository;
identifying a target operating system from the at least one compatible operating system; and
performing the target action on the target operating system of the corresponding virtual machine within the virtual desktop environment.

15. The computer-readable storage device of claim 14, wherein the program further instructs the processor to perform scanning a host operating system of the virtual desktop environment to detect the virtualized applications.

16. The computer-readable storage device of claim 15, wherein scanning the host operating system comprises extracting information from application virtualization executable files.

17. The computer-readable storage device of claim 15, wherein scanning the host operating system comprises extracting information from application virtualization configuration files.

18. The computer-readable storage device of claim 14, wherein discovering virtual appliances comprises using information extracted from virtual appliance descriptor files maintained in the virtual desktop environment.

19. The computer-readable storage device of claim 14, wherein introspecting each virtual machine to detect applications in the virtual machine comprises using information extracted from a virtual machine configuration file.

20. The computer-readable storage device of claim 14, wherein introspecting each virtual machine to detect applications in the virtual machine comprises using information extracted from a virtual appliance descriptor file, if said virtual machine is discovered as belonging to a virtual appliance.

21. The computer-readable storage device of claim 14, wherein the virtual machines in the virtual desktop environment are provided with at least one sensor, further comprising:
introspecting each virtual machine comprises using information provided by the at least one sensor.

22. The computer-readable storage device of claim 21, wherein introspecting each virtual machine using information provided by the at least one sensor comprises:
utilizing at least one sensor that includes a select one of a discovery agent and an agentless discovery technology.

23. The computer-readable storage device of claim 14, wherein introspecting each virtual machine comprises navigating a virtual machine disk format from an external discoverer.

24. The computer-readable storage device of claim 23, wherein navigating the virtual machine disk format from an external discoverer uses at least one Application Programming Interface for connecting and navigating in virtual disks.

25. The computer-readable storage device of claim 14, the program further instructs the processor to perform:
storing additional information identifying the discovered applications in the repository, the additional information further associating each identified application to a particular identified operating system on which the application is running.

26. The computer-readable storage device of claim 14, the program further instructs the processor to perform:
generating a display of the discovered applications with the information related to the operating system on which the application is running; and
using an Application Programming Interface to manage operations on the displayed applications.

* * * * *